3,641,144
CYCLOALIPHATIC CARBOXYLIC ANHYDRIDE
REACTION AND REACTION PRODUCTS
Robert C. Kuder, Excelsior, Minn., assignor to
General Mills, Inc.
No Drawing. Continuation-in-part of application Ser. No. 570,736, Aug. 8, 1966. This application Mar. 13, 1969, Ser. No. 807,112
Int. Cl. C07c 61/12, 61/28
U.S. Cl. 260—546
1 Claim

ABSTRACT OF THE DISCLOSURE

A cycloaliphatic $C_6$–$C_{15}$ olefin having ethylenic unsaturation at an exocyclic carbon position is reacted with an anhydride of a $C_2$–$C_{18}$ carboxylic acid having an available alpha-hydrogen atom in the presence of a free radical initiator thereby forming a novel cycloaliphatic organic acid anhydride adduct. This new class of compounds can be used to make perfumes by conversion to the esters, or to corresponding acids, salts, nitriles or other derivatives.

---

This application is a continuation-in-part of my copending application U.S. Ser. No. 570,736 filed Aug. 8, 1966 now abandoned.

The instant invention relates to the preparation of certain alpha-substituted carboxylic acid compounds, and more particularly, to a process of combining certain carboxylic acid anhydride reactants with certain ethylenically unsaturated reactants to effect alpha-substitution in such anhydride reactants.

The unsaturated reactant used in the practice of the invention contains an ethylenically unsaturated group through which one might expect to obtain olefinic addition polymerization in the presence of a typical polymerization catalyst, i.e., hydrogen peroxide, which is a preferred catalyst for use herein. Also, the carboxylic acid reactant used herein is an organic acid anhydride which one might expect to function as a polymerization accelerator in combination with such hydrogen peroxide catalyst and/or as a co-reactant therewith, e.g. to form a corresponding organic peroxide or hydroperoxide.

In contrast, the ethylenically unsaturated reactant ($x$) and the organic carboxylic acid reactant ($a$) hereof, in the presence of such a polymerization catalyst ($b$), hydrogen peroxide, are believed in the practice of the invention to undergo primarily a reaction according to the following over-simplified Equation A:

(A) 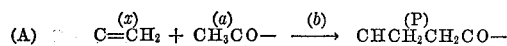

wherein it will be seen that anhydride reactant ($a$) is represented by an acyl group and so is the acid anhydride product (P). Reaction product (P) is substantially a 1:1 adduct of the specific unsaturated reactant ($x$) and the carboxylic acid anhydride ($a$), based on the acyl or acetyl equivalent thereof, vis-a-vis the unsaturation at the methylene group: $=CH_2$ in ($x$).

A conventional textbook type of olefin-carboxylic acid reaction to form an ester is described in Groggins, Unit Processes in Organic Synthesis, fourth edition, 1952, McGraw-Hill (pages 627 and 639) wherein Groggins refers to Equation B below as representative of the reaction:

(B)  $CH_2=CH_2 + CH_3COOH \rightarrow CH_3COOCH_2CH_3$

Apparently the catalyst "sulfuric acid commonly used to effect the union" according to Groggins (p. 627) leaves something to be desired, and he suggests that it is desirable "to get away from the polymerizing effects of sulfuric acid." Groggins further points out that the reaction of Equation B "does not go well with ethylene but does with many higher alkenes, particularly with some terpenes" (page 627); and later (page 639) Groggins explains in greater detail how mild esterification conditions with terpenes, according to his Equation B are to be employed to minimize undesirable polymerization and/or isomerization. It will be seen that certain terpenes happen to be preferred reactants in the present invention; but for use according to previous Equation A, and not in the esterification process (B) of Groggins. Moreover, it will be shown herein that typical polymerization catalysts (i.e. peroxy catalysts) are very effective in catalyzing reaction (A) even though polymerization of the olefinic reactant ($x$) is substantially avoided in the practice of the invention.

Prior to and since Groggins, a number of workers have laid claim to a variety of discoveries relative to the use of ethylene in reactions generalized by Equation C below:

(C) 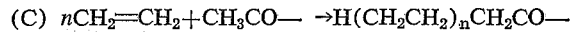

wherein allegedly significant and different values are given for $n$ ranging from 1 to very high numbers. Each such worker has urged some particular set of reaction conditions, reactants and/or factors allegedly unique for his purpose (e.g. Hanford et al. U.S. Pat. No. 2,402,137 in 1946; Roland et al. U.S. Pat. No. 2,433,015 in 1947; and Banes U.S. Pat. No. 2,585,723). Banes alone recites $H_2O_2$, but shows only the use of organic peroxy catalysts and only acid not anhydride reactants.

Some more recent workers have mentioned the use of higher alkenes than ethylene, e.g. Moote U.S. Pat. No. 2,823,216 in 1958, who explains that in his reaction using $C_5$ to $C_{18}$ alkenes he must use at least a $C_3$ carboxylic acid because acetic is not satisfactory for his reaction. This latter difficulty is apparently overcome by Hey et al. in Belgian Pat. No. 621,365, French Pat. No. 1,330,454 and British Pat. No. 960,894 (1964) who claim to use acetic acid, acetic anhydride ethyl acetate and a variety of other $CH_3CO-$ compounds for reaction with alkenes, specifically showing octene-1, butene-1, decene-1 and heptene-1, in the presence of various catalyst including organic peroxides in the examples.

The foregoing Hey et al. disclosures are not completely identical or consistent, except perhaps in the specific descriptions of the examples therein. Thus, in the Hey et al. French and Belgian patents, the olefins are described in general terms including $X_2C=CX_2$ wherein each X may be alkyl, hydrogen, etc., whereas the British patent would appear to be expressly limited to $X_2C=CH_2$ type olefins. On the other hand, only the British patent mentions cyclohexane (page 1, line 50) even though no example for the use thereof is shown, and this particular olefinic type is otherwise clearly excluded from the scope of the British patent disclosure and claims.

In a late 1965 publication by Hey (as co-author with Allen and Cadogen, J. Chem. Soc. 1965, 1918–32) reference is made to various theoretical considerations involved relative to specific reactions comparable to those shown in the aforesaid British patent; but again without describing a specific experiment by the authors using cyclohexene. Instead, on pages 1928–9, the authors confess to an apparent anomaly in a report of Nagai et al. (J. Chem. Soc. Japan) indicating that "the benzoyl peroxide addition of chloracetic acid to cyclohexene involves abstraction of chlorine"; but the observation of the Hey et al. group is made relative to their own work with the ester, ethyl chloroacetate, and without representation as to work actually done by them in connection with any cycloolefin (including cyclohexene).

In such 1965 publication (pages 1928–29), thus, Hey et al. observe that the following Equation D is allegedly known:

(D)
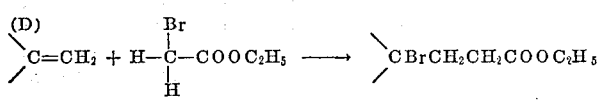

which reaction (D) involves an alpha-Br ester starting material; but they indicate that in the case of octene-1 and the corresponding chloroester they believe the main reaction is that of Equation E:

(E)
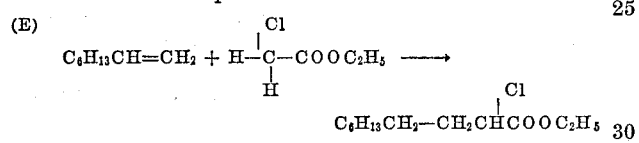

They then note that Nagai et al. have alleged that the "benzoyl peroxide-initiated addition of chloroacetic acid to cyclohexene involves abstraction of chlorine" presumably according to Equation F:

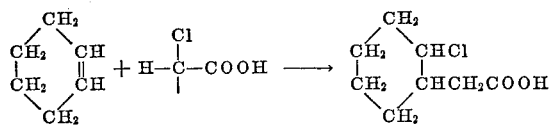

wherein the ethylenic unsaturation between the intracyclic C's is presumably satisfied in part by the alpha-Cl. Hey et al. do not describe a different experimental result; but do point out that prior art suggestions and their own work relative to cyclohexanone-olefin and cyclohexylacetate-olefin additions appear to reveal certain peculiarities of intracyclic groups in these cycloaliphatic ketones and/or esters when used as reactants with olefins. Hey et al. do not, however, describe any work of their own relative to the use of cycloaliphatic olefins with carboxylic acid reactants (or the use of $H_2O_2$).

In contrast, it is a primary object of the instant invention to provide a novel process for preparing certain alpha-substituted carboxylic acid anhydrides, according to previous Equation A, by reaction of (x) a compound having ethylenic unsaturation (preferably at an exocyclic carbon position) and (a) an anhydride of a $C_2$ to $C_{18}$ carboxylic acid having an available alpha-hydrogen atom, such reaction being carried out under free radical forming conditions substantially in liquid state reaction mix and in a substantial molar excess of (a) sufficient to effect primarily reaction of one mol of (x) with each carboxylic acid molar equivalent of such anhydride (a). It is a further object to provide the anhydride product of such process.

Other and further objects, features and advantages of the present invention will be apparent from the following disclosure and examples.

The cyclo aliphatic anhydrides of the instant invention constitute a new class of compounds useful in a variety of chemical syntheses. These anhydrides are very reactive and may be converted by known methods to the corresponding acids, salts, esters, nitriles, amides, chlorides, or other derivatives. These anhydrides are especially useful when converted to esters as disclosed in my copending application U.S. Ser. No. 570,772, filed Aug. 8, 1966. Such esters are useful in perfumes.

These anhydrides may be described generally by the definition: A cycloaliphatic organic acid anhydride formed of (x) at least one cycloaliphatic $C_6$ to $C_{15}$ hydrocarbon group wherein the only available bonds are provided in the form of single bonds on otherwise saturated exocyclic C atoms and (a) at least one $C_2$ to $C_{18}$ acyl group each having at least one carbonyl group providing one bond for direct connection to the anhydride oxide atom and a second bond for direct connection to an alpha C atom which, in turn, provides a single bond for direct connection to one of said exocyclic group (x) C atoms; such that the groups (a) and (x) are bonded together only vis-a-vis said exocyclic group (x) C atoms and said group (a) alpha C atoms; the only atoms other than H and C atoms in each such acyl group (a) being in the aforesaid carbonyl groups.

Also, the characteristic relative structural relationship of alpha, beta and gamma carbon atoms may be used in a more specific definition, wherein the new compound of the invention is defined as a cycloaliphatic organic acid anhydride characterized by the structure:

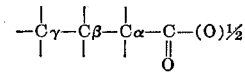

wherein $C\gamma$, $C\beta$ and $C\alpha$ represent, respectively, gamma, beta and alpha carbon atoms and

represents an acyl carbonyl group having a bond available to satisfy the anhydride oxide equivalent: $(O)\frac{1}{2}$; said anhydride consisting essentially of (x) from one to two cycloaliphatic $C_6$ to $C_{15}$ hydrocarbon groups each having at least one cyclic nucleus containing at least four nuclear C's and each such (x) group having available bonds only in the form of single bonds on each of from one to three exocyclic saturated $C\beta$ atoms each of which is in turn connected directly to a $C\gamma$, the aforesaid group (x) available bonds being satisfied by direct connection between each said $C\beta$ atom and an equal number of $C\alpha$ atoms in (a) from one to three $C_2$ to $C_{18}$ acyl groups each having from one to two available bonds only in the form of single bonds each attached to $C\alpha$ atoms each of which is attached to an acyl carbonyl-oxide group:

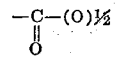

of said structure, such carbonyl-oxide groups containing the only atoms in such acyl groups (a) other than H and C; and in the corresponding definitions for the derivatives thereof such as acids, salts, esters, ketones, nitriles, etc. the

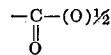

group in the above definition is replaced by

—C—OH, —CN, —C—OM (cation), —C—O Alc.,
 ‖                    ‖                ‖
 O                    O                O —C—Alc.,  —C—NH₂, —C—Cl
                          ‖          ‖       ‖
                          O          O       O wherein M is any typical metal, ammonium, amine, etc. mono or polyvalent cation and Alc. is the residue of any typical alcohol: Alc.-OH which can be $C_1$-$C_{18}$ alkyl or alkenyl, glycol, polyglycol, carbitol, polyIOH (glycerol, pentaerythritol, sorbitol, etc.) as it appears above in either ester or ketone.

The adducts of this invention are prepared by adding the olefin and a small amount of a peroxide initiator gradually, over a period of several hours, to a large excess of boiling acetic anhydride (reaction-temperature is usually 135–140° C.). If the olefin is a solid (such as camphene), it may be predissolved in part of the acetic anhydride before adding it to the reaction-mixture. It will be appreciated that this procedure provides for a very substantial molar excess of acetic anhydride at all times, beginning with the first incremental additions of the olefin and peroxy catalyst, and continuing to maintain the substantial molar excess of the acetic anhydride with subsequent incremental additions of the olefin and the catalyst. The following Examples 1–3 show adducts of about 2:1 in molar ratio of $(a)$ to $(x)$ [i.e., 2 acyl $(a)$ equivalents to each

equivalent], but the reaction mix should have an $(a):(x)$ equivalent ratio within a practical range of about 10:1 to 1000:1 (i.e., molar range of 5:1 to 500:1). Preferably, the $(a):(x)$ equivalent ratio is at least about 25:1 [Ex. 2], or better about 50:1 [Ex. 1, using organic $(b)$], and with inorganic $H_2O_2(b_2)$ about 50:1 [Ex. 3] to about 100:1 is preferred as the minimum. The maximum $(a):(x)$ equivalent ratios of about 500:1 to 1000:1 are determined essentially by practical considerations of plant capacity, etc.; and all such ratios are on an "overall" basis, in view of incremental additions of $(x)$ and $(b)$ to $(a)$ which probably maintain still higher ratios at the immediate reaction scene.

The primary product of the reaction is probably a mixed anhydride, which disproportionates during distillation of the excess acetic anhydride to give the symmetrical cycloaliphatic carboxylic anhydride and acetic anhydride as indicated in Equation $A_3$ below:

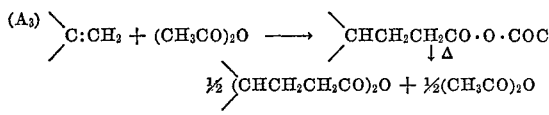

It is also possible that some telomerization should take place, giving higher molecular weight materials of the type

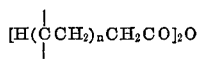

or the corresponding mixed anhydride.

According to the process of this invention, however, very little telomer is formed and the major product is the symmetrical 1:1 adduct (i.e., the adduct with $n=1$).

The nature of the product can be elucidated by determining its saponification number (S.N.), from which can be calculated the ratio of acetic anhydride to olefin combined in the product; by esterifying the product and separating the ester of the 1:1 adduct by distillation or chromatography. Equiv. of $Ac_2O$ i.e., $(CH_3CO)_2O$, combined in product [1]

$$= \frac{\text{Wt. of product} \times \text{S.N.}}{56,100}$$

Wt. of $Ac_2O$ combined in product*

$$= \frac{51 \times \text{wt. of product} \times \text{S.N.}}{56,100}$$

Mols of olefin combined in product $$= \frac{\text{Wt. of product} - \text{wt. of } Ac_2O \text{ in product}}{\text{Mol. wt. of olefin}}$$

Conversion of olefin $= \dfrac{\text{Mols of combined olefin}}{\text{Mols of charged olefin}}$ The ratio, (equiv. of combined $Ac_2O$)/(mols of combined olefin), will be one for the symmetrical 1:1 adduct, $(RR'CHCH_2CH_2CO)_2O$; or two for the mixed 1:1 adduct, $RR'CHCH_2CH_2COOCOCH_3$. The presence of telomers ($n=2$ or more) in the product would lower the values of this ratio.

---

[1] Includes also any small amount of unstripped free $Ac_2O$.

The reaction of Examples 1 through 3, is represented conveniently by the previously mentioned simplified Equation A, or the specific Equations $A_1$ and $A_2$ below:

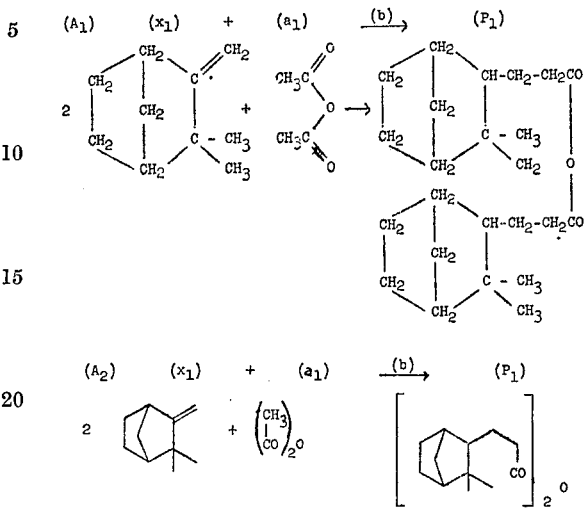

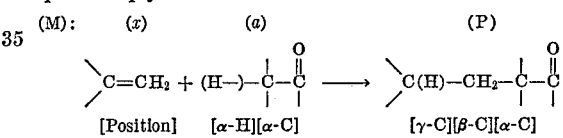

where $(b)$ is a (peroxy) compound often referred to as a polymerization catalyst for (olefinic) addition polymerization, but is more accurately referred to herein as an initiator or promoter of free radical formation. In fact, the instant free radical formation is believed to involve the alpha-hydrogen on the acetyl group, in accordance with a reaction mechanism (M) which might be represented quite simply as follows:

$$(M): \quad \underset{[\text{Position}]}{\overset{(x)}{\diagdown\hspace{-0.2em}\diagup}\!\!C=CH_2} + \underset{[\alpha\text{-H}][\alpha\text{-C}]}{\overset{(a)}{(H-)-\overset{O}{\overset{\|}{C}}-\overset{}{C}}} \longrightarrow \underset{[\gamma\text{-C}][\beta\text{-C}][\alpha\text{-C}]}{\overset{(P)}{\diagdown\hspace{-0.2em}\diagup\!\!C(H)-CH_2-\overset{O}{\overset{\|}{C}}-\overset{}{C}}}$$

In the case of the olefin $(x)$ having the exocyclic methylene group ($=CH_2$), the carbon atom thereof (which may be referred to as the alpha-carbon of an alpha-olefin) indicates the exocyclic carbon position, which is involved in or at which position one may identify the reactive ethylenic unsaturation; and it will be seen that such olefinic exocyclic C becomes a saturated beta-C in the ultimate product (P) wherein the C positions are referenced to the carbonyl group $(C=)$. The second C here shown in the olefin $(x)$ which is also involved in the ethylenic unsaturation is intracyclic in camphene $(x_1)$; and it becomes a saturated gamma-C in the product (P). It is believed that the reaction of the invention is predicated on the availability of the alpha-H (under the free radical promoting conditions here involved) on the alpha-C of the carboxylic acid reactant $(a)$, which is preferably the anhydride of relatively lower molecular weight $C_2$ to $C_5$ alkanoic acids. Such anhydrides are preferred because they ordinarily possess better ability to dissolve the reactant $(x)$ and most forms of organic initiators $(b)$, and they react somewhat more readily. It should be noted that "abstraction" of the $\alpha$-H of $(a)$ to the $\gamma$-C of (P) is herein promoted by inorganic $H_2O_2$ $(b_2)$, as well as the organic free radical initiator $(b_1)$.

In general, the anhydride reactants $(a)$ may be formed of $C_2$ to $C_{18}$ alkanoic acids, e.g., acids containing 2 to 18 C atoms such as acetic $(a_1)$, propionic $(a_2)$, butyric $(a_3)$, isobutyric $(a_4)$, pentanoic $(a_5)$, caproic $(a_6)$, heptanoic $(a_7)$, caprylic $(a_8)$, nonanoic $(a_9)$, capric $(a_{10})$, undecanoic $(a_{11})$, lauric or dodecanoic $(a_{12})$, tridecanoic $(a_{13})$, myristic $(a_{14})$, pentadecanoic $(a_{15})$, palmitic $(a_{16})$, heptadecanoic $(a_{17})$, stearic $(a_{18})$ acids, etc.; and preferably acids containing no ethylenic and/or acetylenic unsaturation and/or groups (other than the principal carbonyl group) which may tend to interfere with the reaction (e.g. hydroxy, etc.). The group attached to the (acid)

carbonyl group may be branched, e.g. diethyl acetic ($a_{19}$), dioctyl acetic ($a_{20}$) acids, etc., or straight chain hydrocarbon, with cyclic hydrocarbon groups, e.g. methylcyclohexyl, cyclohexyl ($a_{21}$), methylphenyl acetic or propionic ($a_{22}$) acids, etc. Also, one may use mixed anhydrides of the foregoing acids ($a_1$) through ($a_{22}$); and anhydrides of polycarboxylic acids, e.g. succinic ($a_{23}$), tetrahydrophthalic ($a_{24}$), methyl or ethyl succinic ($a_{25}$), adipic ($a_{26}$), sebacic ($a_{27}$), up to $C_{18}$ dicarboxylic acids, i.e. octadecanoic ($a_{28}$). Although the instant reaction is preferably carried out using only the essential reactants ($x$), ($a$) and ($b$) in the liquid reaction mixture, in those cases wherein higher molecular weight reactants are used, it may be and often is advantageous to employ anhydrous substantially inert hydrocarbon solvents such as toluene and/or hexane or heptane ( to effect a liquid state reaction mixture) but usually also using heat and some pressure to effectively maintain reaction temperatures within the previously indicated range (and preferably at about 105 to 205° C.). Essentially, the anhydride reactants ($a$) used must have an available alpha-H (on the alpha-carbon next to the acyl carbonyl group). Such acyl group may contain one or more acyl carbonyl groups but must otherwise be inert in the reaction. In a mixed acyl anhydride ($a$), of course, only one alpha-H is necessary; but preferably both monoacyl groups in the anhydride have alpha-H's.

Suitable cyclic olefins which can be used as the reactant ($x$) in the practice of this invention are as follows:

Methylene-cyclopentane ($x_6$)

Methylene-cyclohexane ($x_7$)

Divinyl-cyclobutane ($x_8$)

4-Vinyl-1-cyclohexene ($x_4$) (Ex. 6)

Methylene-cyclopentadiene ($x_{10}$) (fulvene)

Benzofulvene ($x_{11}$)

1,2,4-trivinyl-cyclohexane ($x_5$) (Ex. 7)

One preferred group of cyclic olefinic compounds ($x$) is the monocyclic terpenes:

$\Delta 1,8(9)$-p-menthadiene $C_{10}H_{16}$ limonene ($x_3$) (Ex. 5)

Beta-phellandrene ($x_{12}$) $\Delta 1(7)$, 2-p-menthadiene $C_{10}H_{16}$

Sylvestrene ($x_{13}$) $\Delta 1,8(9)$ m-menthadiene $C_{10}H_{16}$

Beta-terpinene ($x_{14}$) $\Delta 1(7)$ 3-m-menthadiene $C_{10}H_{16}$ $\Delta$-8(9)-p-menthene ($x_{15}$) $C_{10}H_{18}$ $\Delta$-1(7)-m-menthene ($x_{10}$) $C_{10}H_{18}$ Among the terpenes, the preferred compounds are the bicyclic terpenes:

Camphene ($x_1$)

N.B. Encircled numbers indicate numbered carbon positions.

Alpha-fenchene ($x_{16}$)

Beta-fenchene ($x_{17}$)

Beta-pinene ($x_2$) (Ex. 4).

Sesquiterpenes ($C_{15}H_{24}$) are also used:

selinene ($x_{18}$)

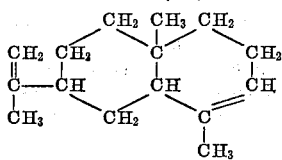

Also used in the invention are vinyl cycloheptane ($x_{19}$), methylene cycloheptane ($x_{20}$), etc.

As hereinbefore indicated, the cyclic reactant ($x$) has reactive ethylene unsaturation in a semicyclic position (preferably in the form of a =$CH_2$ group attached to the ring) but such unsaturation may be between a pair of exocyclic C's, as in the isopropenyl or vinyl groups. In each instance, the unsaturation preferably includes the unsubstituted methylene group, =$CH_2$; but reaction is also obtained at somewhat lower yields in the case of intracyclic terpene unsaturation and in the case of exocyclic unsaturation wherein both C's have some substituents, as in the case of Δ-1,4(8)-p-methadiene terpinolene ($x_{21}$)

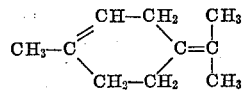

santalene ($x_{22}$) $C_{15}H_{24}$

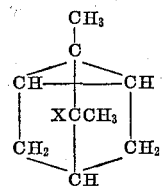

wherein X is $C_6H_{11}$ or

—$CH_2CH_2CH$=$C$—$CH_3$
                    |
                   $CH_3$ sesquicamphene ($x_{1a}$) 8-Δ-1 pentenyl-camphene wherein $X_1$ is $C_6H_{11}$ or —$CH_2CH_2CH_2CH_2CH$=$CH_2$

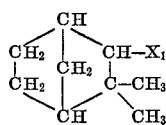

The peroxy agents ($b$) are used in relatively substantial proportions relative to the olefin ($x$). The previous examples show ($x$):($b$) equivalent ratios [i.e., computed as ratios of each

to each —O—O— ($b$)] that are substantially 1:0.3 to substantially 1:0.15, but the actual equivalent ratios which may be used range from a practical minimum effective amount in the neighborhood of 20:1 to 100:1 (below which no significant benefit is ordinarily obtained from the use of the peroxy agent) to a practical maximum of substantially 1:1, although perhaps 2:1 is more practical in most instances, depending on catalyst costs since there is ordinarily not more than nominal advantage obtained in using ratios above substantially 3:1 to 2:1. The organic agent ($b_1$) is predissolved, when used, since the use of typical organic agents ($b$), e.g. the peroxides and/or hydroperoxides and/or ozonides, has certain advantages in that these materials may be more readily dissolved in most of the anhydride reactants ($a$) and/or the olefin reactants ($x$), but the organic agents are often quite expensive, so their use in a solution in order to increase their effectiveness is significant and convenient. The use of hydrogen peroxide as the catalyst is fully disclosed in my copending application, U.S. Ser. No. 570,711, filed Aug. 8, 1966.

Suitable free radical promoting agents, ($b$), include tertiary butyl peroxide ($b_1$)
hydrogen peroxide ($b_2$)
t-butyl hydroperoxide ($b_3$)
benzoyl peroxide ($b_4$)
cumene hydroperoxide ($b_5$)
tetralin hydroperoxide ($b_6$)
diisopropyl benzene hydroperoxide ($b_7$)
t-butyl perbenzoate ($b_8$)
acetyl peroxide ($b_9$)
urea peroxide ($b_{10}$)
methyl ethyl ketone peroxide ($b_{11}$)
diisopropyl ether peroxide ($b_{12}$)
diisopropyl peroxy dicarbonate ($b_{13}$)

It will be understood that some of the more readily decomposed peroxides such as ($b_{13}$) above function more effectively at temperatures below the specified 135–9° C. and corresponding adjustments in the reaction temperatures are made to achieve optimum operating conditions for the various peroxides ($a_1$) through ($a_{13}$).

In addition, any other known free radical initiators may be used, such as:

1% hexachloroethane and 1% tetraborate ($b_{14}$)
3% hydrazine sulfate ($b_{15}$)
1% sodium persulfate and 1% sodium tetraborate ($b_{16}$)
5% dibenzoyl hydrazine ($b_{17}$)
3% tetraethyl lead ($b_{18}$)
ultraviolet radiation per se ($b_{19}$)
ultraviolet radiation with 2% biacetyl ($b_{20}$)

In general, the Friedel-Crafts type catalysts are to be avoided; and in the case of some of the initiators, e.g. ($b_{14}$), ($b_{15}$) or ($b_{16}$), it may be helpful to aid the same with very nominal amounts of water, e.g. as in the case of $H_2O_2$ ($b_2$), although the instant reaction system is essentially anhydrous in character, retaining the anhydride reactant ($a$) and obtaining the anhydride product (P).

The reaction temperatures in the case of a major reactant ($a$) such as acetic anhydride are preferably the reflux temperature for the acetic anhydride, at least in situations wherein the acetic anhydride is capable of dissolving all or substantially all of the olefin ($x$) at such reflux temperatures, which are substantially 134–9° C. The reaction temperature may, however, range from a minimum effective temperature that may be as low as perhaps 75 to 100° C., although reaction temperatures above 100° C. are preferred in most instances and a maximum practical reaction temperature of about 200° C. (e.g. range of substantially 105° to 205° C.) is ordinarily not excessive for good results in the practice of the invention. The upper reaction temperature will often be limited primarily (as well as easily controlled), under atmospheric pressure, by the reflux temperature of the predominating material, i.e., usually the anhydride, e.g. ($a_1$) acetic, B.P. 134–9° C.; ($a_2$) propionic, B.P. 168° C.; ($a_3$) or ($a_4$) butyric or isobutyric, B.P.'s 192°, 182.5° C.; and ($a_5$) valeric, B.P. 205° C., anhydrides. Even though ($x_1$) camphene, B.P. 157° C. or ($x_{12}$) beta-phellandrene, B.P. 176° C. may have lower boiling points than some anhydride reactants ($a$), the resulting products (P) will not, and slow incremental additions of the olefin ($x$) and/or initiator ($b_2$) $H_2O_2$ will have only a nominal effect on the reflux condition. Subsequent stripping of the excess anhydride ($a$) and/or inerts or unreacted olefin ($x$) may be and usually is completed at reduced pressures, and various pressures may also be used for carrying out the entire reaction within substantially the overall temperature limits hereinbefore indicated. In essence, the agent ($b$) preferred for use herein is recognized as being a material which is decomposed by heat at various rates depending upon the overall conditions and, of course, the actual temperature to which this agent ($b$) is subjected. Ordinarily, the reaction system is set up under operating conditions which will afford a preferred rate of decomposition for the catalyst (without drastic or explosive decomposition), so that the function of the catalyst in promoting free radical formation will take place under optimum reaction conditions for maximum yield. The cost of materials involved is ordinarily such that the time of reaction is not as critical a consideration as the overall yield of the product, and similar considerations of this nature; but the operating temperature employed is such that the overall reaction time will be reduced to a practical figure, at least to the extent that this may be done without unduly subtracting from certain essential features such as the percent of yield. In this respect, the subsequent Table I indicates a number of variables for a given reaction system (i.e. camphene and acetic anhydride), as a guide for carrying out the specific reaction described and/or comparable reactions using other reactants. In Table I it will be seen that the top portion thereof designates in successive columns from left to right the run number, the camphene purity, the mol ratio of $(a):(x)$, the reaction times (for addition and for overall time), and the ultimate stripping temperature employed. In the lower half of Table I, designated Table IA, it will be seen that the columns, from left to right, indicate the run number, the product saponification number, and the conversion computations which indicate the number of equivalents of acetic anhydride reacted, the number of mols of camphene reacted, the percent camphene reacted and the percent of 1:1 or "equimolar" adduct obtained in the product. The other reaction conditions of substantially acetic anhydride reflux temperature, incremental addition of olefin and peroxide, etc. specifically described in Examples 1 through 3 hereof are used in the various runs designated on Table I, unless otherwise specified on such table.

The use of the foregoing acid anhydrides herein is easily demonstrated, for example, by carrying out the procedure of Example 1 hereof using the anhydrides of a cut of saturated coconut oil fatty acids $(a_{10})$, $(a_{12})$, $(a_{14})$, $(a_{16})$ and $(a_{18})$, in the relative proportions found in the coconut oil, such anhydrides being formed initially by refluxing the acids with acetic anhydride (i.e. for about 10 hours and then stripping off the lower boiling acetic anhydride). The resultant anhydride mixture (50 equivalents) is maintained at substantially 150° C. during (eight hours of) incremental additions of camphene $(x_1)$ and t-butyl peroxide $(b_1)$ in the amounts specified in Example 1 (predispersed in about 390 g. of such anhydride mixture at about 50° C.). The 150° C. temperature is maintained for an additional 16 hours and then pressure is reduced to strip off the unreacted anhydride (at substantially 150° C./0.05 mm. Hg) so as to obtain the product mixture $(P_2)$:

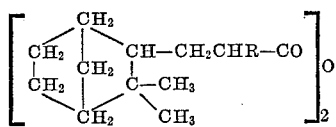

wherein R is a $C_8$ to $C_{16}$ alkyl group.

If the above procedure can be repeated using lauric anhydride $(a_{12})$ as the reactant $(a)$, the resulting product $(P_3)$ has the foregoing formula $(P_2)$ wherein R is a decyl group. Repeating the same procedure but using as reactant $(a)$ myristic anhydride $(a_{14})$ one obtains a product $(P_4)$ wherein R of the formula $(P_2)$ is dodecyl group. In each of the foregoing procedures the separation of the excess anhydrides $(a_{12})$ and/or $(a_{14})$ to obtain the products $(P_3)$ and $(P_4)$ is simplified because of the absence of product mixtures, and also higher yields are obtained (or at least are ascertainable).

The foregoing procedure may be repeated using $(a_9)$ nonanoic anhydride; stripping off of excess $(a_9)$ is effected at substantially 100° C./0.04 mm. Hg. The same conditions are used for mixtures of $(a_9)$, $(a_{11})$, $(a_{13})$, $(a_{15})$ and/or $(a_{17})$, or for the individual anhydrides. In contrast, a better yield is recoverable using individually or mixtures of anhydrides $(a_8)$, $(a_7)$, $(a_6)$ and/or $(a_5)$ and stripping off the excess anhydride at 160° C./18 mm. Hg.

In the case of $(a_2)$, $(a_3)$ and/or $(a_4)$ the procedure of Example 1 is followed exactly (using corresponding molar proportions), including refluxing during reaction and stripping off excess anhydride as described, the reaction temperatures being 168° C. $(a_2)$, 192° C. $(a_3)$ and 182.5° C. $(a_4)$, respectively, obtaining the corresponding anhydrides of the camphene-propionic $(N_5)$, -butyric $(P_6)$ and -isobutyric $(P_7)$ acid adducts.

Corresponding results are obtained by first preparing, as above, the anhydride of acids $(a_{19}-a_{28})$, except that the anhydrides of dicarboxylic acids, $(a_{23})$ to $(a_{28})$, will form the corresponding di-adducts at each of the alpha carbon positions present in such dicarboxylic acid molecules. Thus, the product $(P_8)$ obtained using one or more anhydrides $(a_1)$ through $(a_{22})$ has the formula:

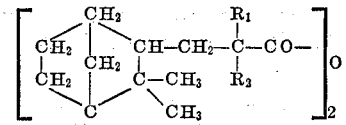

(wherein for cycloaliphatic reactants $(a_{21})$ $R_1R_2$ becomes a divalent pentamethylene group, but in general) wherein each $R_1$ and $R_2$ may be H or a saturated aliphatic hydrocarbon, i.e., alkyl, aralkyl, alkaryl, cycloaliphatic, etc. and the total number of carbon atoms in $R_1$ plus $R_2$ is not more than about 16. The product $(P_9)$ obtained using succinic $(a_{23})$ or other dicarboxylic acids $(a_{24})$ et seq. has the formula:

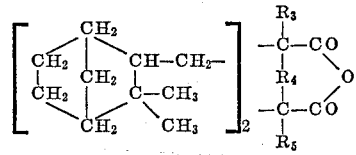

wherein $R_4$ can be a bond between alpha C's (as in succinic) or a divalent, aliphatic saturated hydrocarbon group and each $R_3$ and $R_5$ can be H or an aliphatic saturated hydrocarbon group; and the total number of C's in $R_3$ plus $R_4$ plus $R_5$ is not more than about 14, and $R_3R_5$ is tetramethylene for reactant $(a_{24})$.

The procedure may also be repeated using succinic $(a_{23})$ and adipic $(a_{26})$ anhydrides in one-half the molar amount of the acetic anhydride, and it is found that the excess anhydride is removed to obtain the resultant adducts: camphene-succinic anhydride $(P_{10})$, camphene-succinic-adipic-anhydride mixture $(P_{11})$ or camphene-adipic anhydride $(P_{12})$ depending upon the selection of the starting reactant $(a)$.

As shown above, the general procedure of Example 1 is used with variations. Tertiary butyl peroxide $(b_1)$ is a preferred catalyst or free radical promoting agent $(b)$ or use in the practice of the instant invention, but other agents may be used in the same molar proportions as indicated herein. The use of hydrogen peroxide $(b_2)$ has also been shown, but it will be appreciated that hydrogen peroxide, as such, is available commercially in various aqueous concentrations, generally ranging from about 30% by weight to approximately 70%, or even 90% by weight. The small amount of water actually incoporated at any time with a given incremental addition of hydrogen peroxide (according to the procedure of Example 3 hereinbefore described) is very small, and such water will have only a nominal transitory effect for the reason that the reaction mixture is preferably maintained at a temperaure above 100° C. at all times, and the acetic anhydride or other acid anhydride will be present initially in a sufficiently great quantity so that the water will react rapidly with the anhydride to give a very low concentration of free acetic or other organic acid and the hydrogen peroxide will carry out its function in an essentially organic medium (i.e., essentially the acid anhydride plus a very small amount of free acid and nominal amounts of product already formed and the incremental portion of olefin added contemporaneously with the addition of hydrogen peroxide). The hydrogen peroxide in such essentially organic medium undergoes a controlled decomposition such that it functions effectively for the promotion of free radicals in the manner desired. The actual yield obtained using hydrogen peroxide is ordinarily somewhat lower than that obtained using a preferred organic peroxide or hydroperoxide, such as tertiary butyl peroxide ($b_1$), but the use of hydrogen peroxide affords substantial economic advantages in that it is less expensive than the organic peroxides and/or hydroperoxides.

The procedure of each of the following Examples 4 through 7 may be repeated using, instead of acetic anhydride ($a_1$), propionic anhydride ($a_2$), and comparable results obtained, the reflux reaction temperature, however, being about 168° C. Repeating the same procedure using butyric anhydride, one obtains comparable results using the reflux temperature of about 192° C.; but somewhat better yields are obtained if a controlled temperature for the reaction is maintained at approximately 150-160° C. Comparable results are obtained, however, using various other anhydrides ($a_5$) through ($a_{28}$), in the previous procedures disclosed herein, but using in place of camphene ($x_1$), the cyclic olefins of Examples 4 and 5, namely, β-pinene ($x_2$) and d-limonene ($x_3$), which are the olefins used in Examples 4 and 5. Comparable results are obtained using the organic peroxy compounds ($b_1$) and ($b_3$) through ($b_{13}$) in the proportions actually described in Examples 4 through 7. The use of hydrogen peroxide ($b_2$) in Examples 4 through 7 results in good yields, although not quite as high yields as are described in Examples 4 through 7. In addition, the various other free radical initiators hereinbefore described ($b_{14}$) through ($b_{20}$) are used in Example 4, in the proportions indicated, in order to obtain good yields of the product ($P_{13}$).

Examples 1, 2 and 3 hereof may be repeated using valeric anhydride in place of ($a_1$), and refluxing at 205° C. and the resulting alpha-camphenyl-valeric anhydride is obtained.

The embodiments of this invention will be further illustrated by but are not limited to the following examples. Examples 1–3 hereof illustrate the use of ($x_1$) camphene as the olefin. A commercial grade of camphene is used containing 83% actual camphene; the remainder is chiefly tricyclene, a saturated isomer of camphene which is not understood to react with acetic anhydride ($a_1$) under the conditions used.

EXAMPLE 1

A solution of 136 g. commercial ($x_1$) camphene (1.00 mol total, 0.83 mol actual camphene) and 22 g. t-butyl peroxide (0.15 mol) in 390 g. acetic anhydride ($a_1$) is added incrementally over a period of eight hours to 2160 g. acetic anhydride (total of 25 mols or 50 equivalents) maintained at the reflux temperature (138–139° C.). The reaction mixture is then refluxed for 16 hours longer, then excess acetic anhydride is distilled off at atmospheric pressure until a pot temperature of 150° C. is attained and only 304 g. of material remains. Of this remainder, 300 g. is vacuum-stripped to a pot temperature of 150° C. at 6 mm. Hg. pressure, leaving a residual liquid product of 155 g. This product has a saponification number of 338.8, corresponding to 0.95 equivalent of combined acetic anhydride and 0.80 mol of combined camphene, or 96% of the actual camphene charged. This product comprises mostly the symmetrical anhydride of 3,3-dimethyl-2-norbornanepropionic acid ($P_1$):

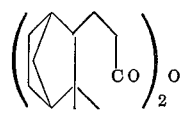

as shown by the acetic anhydride/camphene ratio of 1.19 and by the fact that the product when esterified with ethanol contains 82% of the corresponding ethyl ester (calc. S.N., 251; found 252.1, 252.4).

Further runs using camphene and acetic anhydride with tertiary butyl peroxide catalyst are summarized in Table I and IA below.

REACTION OF CAMPHENE WITH ACETIC ANHYDRIDE [1]

TABLE I

| Run No. | Camphene purity, percent | Mol ratio, Ac₂O: camphene | Reaction time, hr. Addn. | Reaction time, hr. Total | Max. stripping temp., ° C. |
|---|---|---|---|---|---|
| A | 90 | 25:1 | 5 | 6 | 144 |
| B | 83 | 25:1 | 5 | 6 | 150 |
| C | 83 | 25:1 | 8 | 24 | 150 |
| D | 83 | 25:1 | 8 | 24 | 150 |
| E | 83 | 25:1 | 8 | 24 | 158 |
| F | 88 | 25:1 | 8 | 24 | 162 |
| a | 83 | 14.4:1 | 8 | 24 | 150 |
| b | 83 | 12.5:1 | 6 | 7 | 100 |
| c | 83 | 12.5:1 | 4 | 7 | 100 |
| d | 83 | 12.5:1 | 8 | 24 | 100 |
| e | 83 | 12.5:1 | 8 | 24 | 101 |
| f | 83 | 12.5:1 | 8 | 24 | 151 |
| G | 83 | 12.5:1 | 8 | 24 | 152 |
| g | 83 | 12.5:1 | 8 | 24 | 160 |
| H | 83 | 12.5:1 | 8 | 24 | 164 |

[1] See footnotes at end of Table IA.

TABLE IA

| Run No. | Product S.N.[2] | Conversion Ac₂O, equiv.[3] | Conversion Camphene Mol[3] | Conversion Camphene Percent | Percent 1:1 adduct in product[4] |
|---|---|---|---|---|---|
| A | 367.0 | 1.115 | 0.812 | 90 | 85 |
| B | 333.1 | 0.798 | .695 | 84 | 90 |
| C | 338.8 | .949 | .800 | 96 | 82 |
| D | 334.0 | .571 | .491 | 59 | |
| E | 323.4 | .880 | .795 | 96 | 84 |
| F | 324.0 | .943 | .847 | 96 | 85 |
| a | 321.0 | .855 | .778 | 94 | 81 |
| b | 391.8 | .910 | .620 | 75 | 83 |
| c | 393.2 | .940 | .635 | 77 | |
| d | 341.8 | .947 | .790 | 95 | 80 |
| e | 352.6 | .965 | .768 | 93 | |
| f | 317.0 | .825 | .765 | 92 | 82 |
| G | 325.9 | .858 | .765 | 92 | 82 |
| g | 335.5 | .903 | .775 | 93 | 81 |
| H | 325.0 | .855 | .762 | 92 | 83 |

[1] At reflux, using 0.15 mol t-Bu₂O₂ per 136 g. commercial camphene, except in D where 0.3 mol of H₂O₂ was used.
[2] Saponification number.
[3] Per 136 g. of commercial camphene charged.
[4] As determined by esterification.

EXAMPLE 2

The preparation described in Example 1 is repeated except that twice as much camphene ($x_1$) and t-butyl peroxide are used, keeping the amount of acetic anhydride ($a_1$) the same; reaction temperature is 134–139° C. and final stripping temperature is 164° C. at 12 mm. Hg. A product is obtained with saponification number of 326.0, corresponding to an acetic anhydride/camphene ratio of 1.12 equivalent per mol and a conversion of 92% of actual camphene charged. The butyl esters of the product contain 83% of the ester of the 1:1 adduct.

EXAMPLE 3

A solution of 136 g. commercial camphene in 390 g. acetic anhydride is added from one addition-funnel, and 34.2 g. 30% hydrogen peroxide (0.3 mol) is added separately but simultaneously from another addition-funnel, incrementally over a period of eight hours, to 2160 g. acetic anhydride maintained at the reflux temperature (134–138° C.). The reaction mixture is then refluxed for 16 hours longer, then the excess acetic anhydride is distilled off at atmospheric pressure until a pot temperature of 150° C. is attained and only 290 g. of material remains. Of this remainder, 288.5 g. is vacuum-stripped to a pot temperature of 150° C. at 7.5 mm. Hg leaving a residual liquid product of 95.5 g. This product has a saponification number of 334.0, corresponding to an acetic anhydride/camphene ratio of 1.16 equivalent/mol and a conversion of 59% of actual camphene charged.

EXAMPLE 4

A solution of 22 g. t-butyl peroxide in 136 g. β-pinene ($x_2$) (1 mol) is added over a period of 8 hours to 2550 g. acetic anhydride (25 mols) maintained at the reflux temperature (137–139° C.). The reaction mixture is then refluxed for 16 hours longer, then the excess acetic anhydride is distilled off at atmospheric pressure until a pot temperature of 150° C. is attained and 414.5 g. of material remains. Of this remainder, 412 g. is vacuum-stripped to a pot temperature of 152° C. at 12 mm. Hg, leaving a residual liquid product of 174 g. This product has a saponification number of 320.9 corresponding to 1.00 equivalent of combined acetic anhydride and 0.91 mol of combined β-pinene. In this case, a rearrangement takes place in the cyclic olefin ring and the major ingredient of the product is the symmetrical anhydride of 4-isopropyl-cyclohexene-1-propionic acid ($P_{13}$):

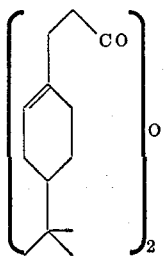

EXAMPLE 5

A solution of 22 g. t-butyl peroxide in 136 g. d-limonene ($x_3$) (1 mol) is added over a period of five hours to 2550 g. acetic anhydride maintained at the reflux temperature (136.5–138.5° C.). The reaction mixture is refluxed for one hour longer and then worked up as in the previous examples. The final stripping temperature is 110° C. at 12 mm. Hg. A liquid product is obtained with saponification number 302.4, corresponding to 0.54 equivalent of combined acetic anhydride and 0.53 mol of combined limonene.

EXAMPLE 6

A solution of 22 g. t-butyl peroxide in 108 g. 4-vinyl-1-cyclohexene ($x_4$) (1 mol) is added over a period of eight hours to 2550 g. acetic anhydride maintained at the reflux temperature (134–139° C.). The reaction mixture is refluxed for 16 hours longer and then worked up as in the previous examples. The final stripping temperature is 135° C. at 10 mm. Hg. A liquid product is obtained with saponification number 335.4, corresponding to 0.45 equivalent of combine dacetic anhydride and 0.48 mol of combined acetic anhydride and 0.48 mol of combined vinylcyclohexane.

EXAMPLE 7

A solution of 22 g. t-butyl peroxide and 54 g. 1,2,4-trivinylcyclohexane ($x_5$) (0.33 mol) in 102 g. acetic anhydride is added over a period of eight hours to 2448 g. acetic anhydride (total 25 mols) maintained at reflux (137–139° C.). The reaction mixture is then refluxed for 16 hours longer and then worked up as the previous examples. The final stripping temperature is 92° C. at 13 mm. Hg. A crumbly rubbery solid product is obtained with saponification number 497.4, corresponding to 0.90 equivalent of combined acetic anhydride and 0.34 equivalent of combined trivinylcyclohexane.

It can thus be seen that the process of the invention is essentially that of producing an alpha-substituted acyl anhydride; and in defining such compound herein the alpha-substituent may be identified by "alpha" followed by the identification of the alpha-substituent in brackets or parentheses, e.g., alpha-[$C_{10}$ terpenyl substituted]-acetic anhydride, or -$C_2$ to $C_5$ alkanoic acid anhydride, in which latter case of the anhydrides (a) are acetic to valeric, all boiling substantially within the range of 105° to 205° C. In the case of valeric anhydride ($a_5$) (B.P. about 205° C.) the reflux temperature is considered to be at the top of the practical range of 100°–105° up to 200°–205° C. (which is a desired condition for a generally anhydrous reaction scene), although even within this preferred range it appears that better yields are obtained at substantially 130° to 170° C., i.e., using ($a_1$), ($a_2$), ($a_3$), ($a_4$) and/or ($a_5$), which does not involve refluxing at atmospheric pressure but is still a controlled reaction temperature, and one which need not be exceeding in subsequent subatmospheric pressure stripping. Additional embodiments of the processes and products of the invention, wherein the ingredients are designated by the previously identified subscripts to (a), (x), (b), etc., include:

(II) Repeating the procedure of Example 3 using ($a_2$) in the same (25 mol) proportion and temperature (i.e., 135°*140° C., but without refluxing) the product obtained in comparable yield is: ($P_{21}$) alpha-(dihydrocamphenyl)-propionic anhydride.

(III) Repeating the foregoing procedure (II) using one mol of ($x_6$) instead of ($x_1$), a comparable result is achieved in obtaining ($P_{22}$) alpha-(cyclopentyl methyl)-propionic anhydride; and, likewise, (IV) with ($x_7$) the alpha-(cyclohexylmethyl) propionic anhydride ($P_{23}$) is obtained;

(IV) With ($x_{20}$) methylenecycloheptane, the product ($P_{24}$) is alpha-(cycloheptylmethyl) propionic anhydride;

(V) With ($x_{10}$) and ($x_{11}$) respectively the exocyclic =$CH_2$ becomes the alpha-methylene linkage, i.e., —$CH_2$— between the ($x_{10}$) and ($x_{11}$) cycloolefin residues and the alpha-carbon of the propionic anhydride in ($P_{25}$) and ($P_{26}$), respectively;

(VII) With ($x_{16}$), ($x_{17}$) and ($x_2$) in place of ($x_1$) in this procedure, comparable yields are obtained as: ($P_{27}$), ($P_{28}$), ($P_{29}$), respectively the propionic anhydride alpha-substituted, via the methylene linkage at the formerly unsaturated carbon of alpha-fenchene, beta-fenchene and beta-pinene; and (VIII) Repeating the foregoing with ($a_3$) to ($a_{22}$) anhydrides of such monocarboxylic acids and ($x_8$) alpha-substitution is obtained in part on the foregoing 1:1 adduct basis, e.g., ($P_{30}$) alpha-(vinylcyclobutylethyl)-propionic anhydride or alkanoic anhydride; but the reaction tends toward an adduct of 1 mol of ($x_8$) per 2 molar equivalents of ($a_3$) through ($a_{22}$), e.g.:

($P_{31}$) Generally represented:

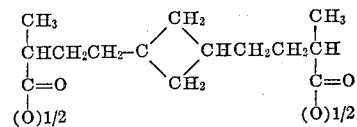

which is theoretically comparable to and obtained in yield comparable to those of the product of Example 7, which could be represented:

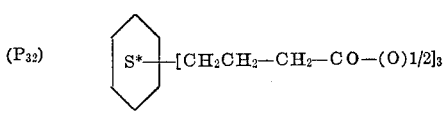

*S = Saturated.

In contrast, (IX) if a dicarboxylic acid anhydride is used, in accordance with the procedures described above, but with essentially monofunctional (x) compounds such as ($x_1$) through ($x_3$), ($x_6$) through ($x_{22}$), the results are comparable with essentially two mols of (x) adding to one mol of such dicarboxylic acid anhydride ($a_{23}$) through ($a_{28}$); but (X) using di-functional ($x_8$) an essentially equimolar addition product of ($x_8$) and ($a_{23}$) through ($a_{28}$) is obtained and (XI) using tri-function ($x_5$) with such dicarboxylic acid anhydrides ($a_{23}$) through ($a_{28}$) (in the procedure of Example 7 hereof), the product is essentially an (x):(a) adduct in 2:3 molar proportion, but in both (X) and (XI) hereof, the yields include the other possibilities, i.e. 1:1, 1:2, 2:1, etc. and this aspect of identification is complicated, even though it is possible to ascertain that the dominating reaction is alpha-substitution.

In the case of the monocyclic ($C_{10}$) terpenes, i.e. those containing 10 carbon atoms, the $C_{10}H_{16}$ ($x_3$), ($x_{12}$), ($x_{13}$), ($x_{15}$) and ($x_{21}$) terpenes are preferred in one category, and the $C_{10}H_{18}$ ($x_{15}$) and ($x_{10}$) in the other. The products are respectively alpha-($C_{10}H_{17}$ substituted)- and alpha-($C_{10}H_{19}$ substituted)- acyl compounds. The bicyclic terpenes preferred are ($x_1$), ($x_{16}$), ($x_{17}$) and ($x_2$), which result in alpha-($C_{10}H_{17}$ substituted)-acyl compounds. Preferably the terpenes used have a reactive exocyclic methylene (=$CH_2$) carbon which is unsubstituted (as in the so-called alpha- or primary olefin); but lower $C_1$–$C_4$ alkyl groups on such exocyclic C are not precluded, e.g. ($x_{21}$) or ($x_{22}$). Likewise, although vinyl cycloaliphatic hydrocarbons ($x_8$), ($x_4$), ($x_5$), etc. produce good results herein, it is found that particularly in the case of the various monocyclic terpenes ($x_3$), ($x_{13}$), ($x_{15}$), as well as bicyclic terpenes ($x_{18}$), the unsaturation may be between two exocyclic C's, as in the typical isopropenyl group —C($CH_3$)=$CH_2$ instead of a simple unsubstituted vinyl group —CH=$CH_2$.

Although previously indicated, the compounds of the invention can be described on the basis of the addition products of so many (x) groups to so many (a) groups, at the alpha-position on (a); and the resulting (x) group for any given starting reactant (x) differs only in that a reactant (x) unsaturation is satisfied by one H and one bond (which, in turn, attaches to the acyl group as a replacement for the original alpha-H) it is apparent that a fundamental structure in the product is

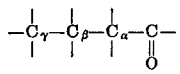

and preferably

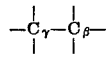

is the resultant $C_6$ to $C_{15}$ hydrocarbon group (x), which contains only C and H atoms, and which has no acetylenic unsaturation and not more than one or two ethylenic unsaturation. Benzenoid unsaturation is not excluded and not considered functional or reactive herein. On the foregoing basis, of course, the reactant (x) must be represented as

which is a $C_6$–$C_{15}$ cycloaliphatic olefin, differing from the group (x) definition only in that there is the addition unsaturation (and the alpha-, beta- and gamma-C designations are changed). Preferred terpene reactants and "groups" compare as follows:

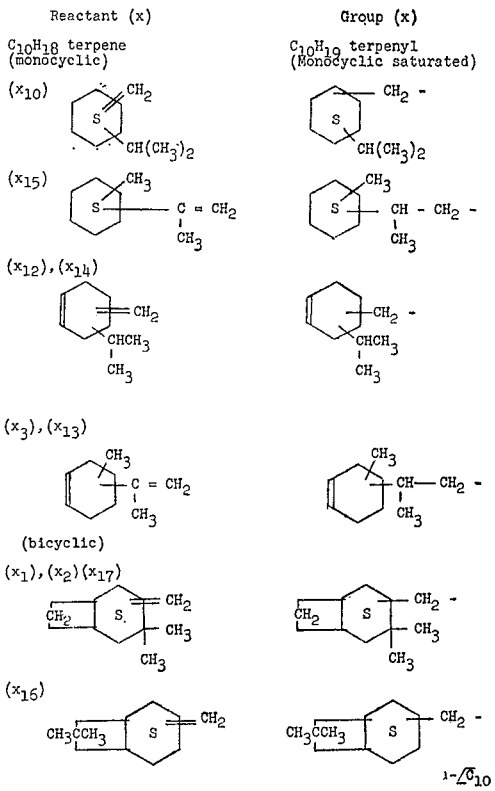

Hence preferred compounds of the invention are alpha-[$C_{10}$ terpentyl]-actyl anhydride of a $C_2$ to $C_5$ carboxylic acid, viz. alpha-[$C_{10}H_{17}$ terpenyl]-acetic anhydride and alpha-[$C_{10}H_{19}$ terpenyl]-acetic anhydride.

The embodiments of the present invention in which an exclusive property or privilege is claimed are defined as follows:

1. The anhydride of 3,3-dimethyl-2-norbornanepropionic acid.

References Cited

FOREIGN PATENTS 960,894   6/1964   Great Britain _____ 260—546

OTHER REFERENCES

Allen et al., J. Chem. Soc. 1965, 1918.

LORRAINE H. WEINBERGER, Primary Examiner

R. GERSTL, Assistant Examiner

U.S. Cl. X.R.

252—552; 260—464, 468 R, 468 B, 468 F, 514 R, 514 B, 544 L, 557 R, 557 B, 587

PO-1050
(5/69)

UNITED STATES PATENT OFFICE
CERTIFICATE OF CORRECTION

Patent No. 3,641,144        Dated February 8, 1972

Inventor(s) Robert C. Kuder

It is certified that error appears in the above-identified patent and that said Letters Patent are hereby corrected as shown below:

Col. 3, line 39, the formula should read

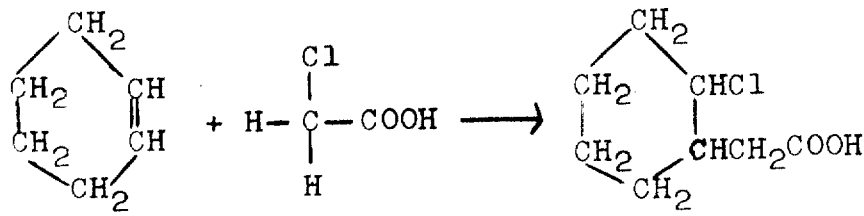

Col. 4, line 68, delete "polyIOH" and insert ---poly-OH---.
Col. 5, line 57, delete "Ac₃O" and insert ---Ac₂O---
Col. 10, line 24, after "1%" (second occurrence) insert---sodium---.
Col. 12, line 9, delete "(N₅)" and insert ---(P₅)---.
Col. 15, line 30, in the formula delete the horizontal bond.
Col. 16, line 2, after "case" delete "of".
Col. 16, line 20, delete "135°*140°C." insert ---135°-140°C.---.
       line 51, the formula should read...

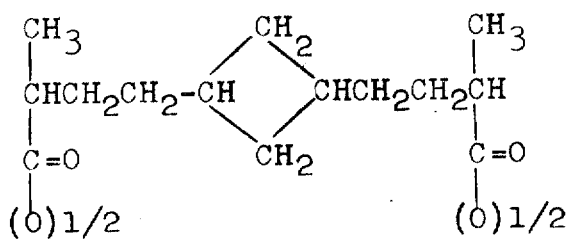

Col. 18, l. 37, delete "terpentyl]-actyl" and insert therefor
       ---terpenyl]-acyl---.

Signed and sealed this 31st day of October 1972.

(SEAL)
Attest:

EDWARD M.FLETCHER,JR.        ROBERT GOTTSCHALK
Attesting Officer        Commissioner of Patents